United States Patent
Romagnoli et al.

(10) Patent No.: US 10,363,707 B2
(45) Date of Patent: Jul. 30, 2019

(54) SYSTEM AND METHOD FOR IN-LINE CONTROLLING THE ULTRASONIC WELDING OF PLASTIC COMPONENTS OF AN ELECTRONIC CIGARETTE

(71) Applicant: G.D SOCIETA' PER AZIONI, Bologna (IT)

(72) Inventors: Massimo Romagnoli, Bologna (IT); Carlo Moretti, Bologna (IT); Massimo Sartoni, Bologna (IT); Luca Federici, Bologna (IT)

(73) Assignee: G.D SOCIETA' PER AZIONI, Bologna (IT)

(*) Notice: Subject to any disclaimer, the term of this patent is extended or adjusted under 35 U.S.C. 154(b) by 134 days.

(21) Appl. No.: 15/695,116

(22) Filed: Sep. 5, 2017

(65) Prior Publication Data
US 2018/0071997 A1 Mar. 15, 2018

(30) Foreign Application Priority Data
Sep. 5, 2016 (IT) .................. 102016000089504

(51) Int. Cl.
*B32B 37/00* (2006.01)
*B29C 65/00* (2006.01)
(Continued)

(52) U.S. Cl.
CPC ........ *B29C 66/92431* (2013.01); *B29C 65/08* (2013.01); *B29C 65/8246* (2013.01);
(Continued)

(58) Field of Classification Search
CPC ... B29C 65/08; B29C 65/8246; B29C 66/112; B29C 66/114; B29C 66/131;
(Continued)

(56) References Cited

U.S. PATENT DOCUMENTS

| | | | |
|---|---|---|---|
| 2013/0081642 A1* | 4/2013 | Safari | A24F 47/008 131/329 |
| 2015/0027471 A1* | 1/2015 | Feldman | H05B 3/16 131/329 |
| 2015/0223522 A1 | 8/2015 | Ampolini et al. | |

FOREIGN PATENT DOCUMENTS

| WO | WO-2012059624 A1 | 5/2012 |
|---|---|---|
| WO | WO-2014150979 A2 | 9/2014 |

OTHER PUBLICATIONS

Search Report in Italian Application No. 201600089504 dated Jul. 10, 2017.

* cited by examiner

*Primary Examiner* — James D Sells
(74) *Attorney, Agent, or Firm* — Marshall, Gerstein & Borun LLP

(57) ABSTRACT

A system for in-line controlling of the ultrasonic welding of plastic components of an electronic cigarette, in which plastic components are welded to one another at a welding zone to define a welded group; the plastic components are such that the welded group has an air passage duct having a first open end and a second open end. The system includes: a chamber for receiving the welded group; a closure for closing the first open end; air supply for supplying air into the chamber. The system further includes an air exit, connecting the welding zone with the outside of the chamber; a continuous pressure control and adjustment for continuously controlling and regulating the air pressure that enters the air passage duct to keep a fixed air pressure; an air passage nozzle having a predetermined cross section, position between the continuous pressure control and adjustment and the second open end; and a pressure sensor for detecting the air back pressure generated in the chamber after the introduction of air into the air passage duct.

10 Claims, 2 Drawing Sheets

(51) Int. Cl.
    *B29C 65/08*          (2006.01)
    *B29C 65/82*          (2006.01)
    *G01M 3/28*           (2006.01)
    *A24F 47/00*          (2006.01)
    *B29L 31/00*          (2006.01)

(52) U.S. Cl.
    CPC .......... *B29C 66/112* (2013.01); *B29C 66/114* (2013.01); *B29C 66/131* (2013.01); *B29C 66/5342* (2013.01); *B29C 66/5344* (2013.01); *B29C 66/9221* (2013.01); *G01M 3/2884* (2013.01); *A24F 47/008* (2013.01); *B29C 66/524* (2013.01); *B29C 66/5346* (2013.01); *B29L 2031/7416* (2013.01)

(58) Field of Classification Search
    CPC ............ B29C 66/5342; B29C 66/5344; B29C 66/9221; B29C 66/92431; G01M 3/2884
    USPC ....................................................... 156/73.1
    See application file for complete search history.

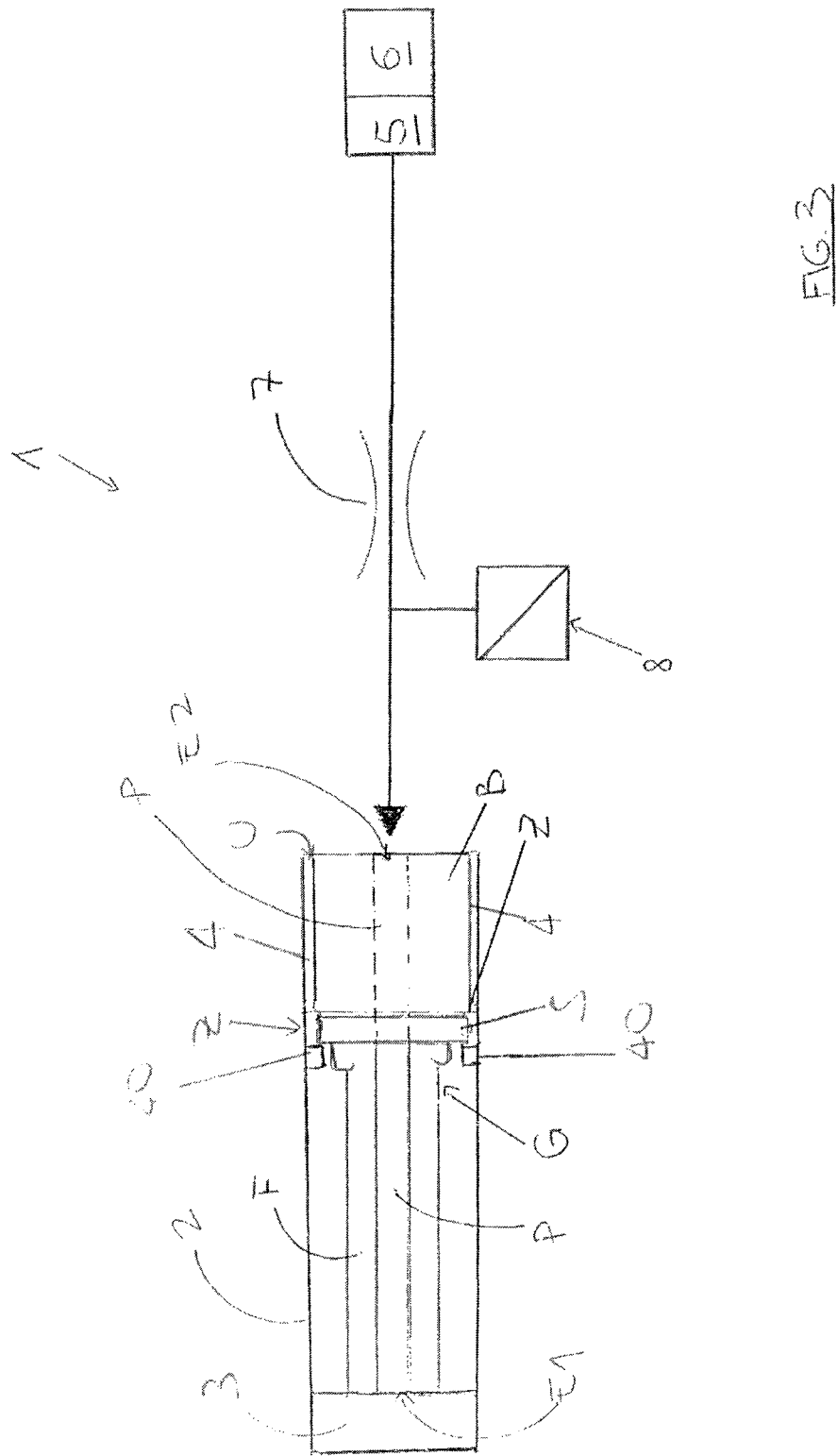

SYSTEM AND METHOD FOR IN-LINE CONTROLLING THE ULTRASONIC WELDING OF PLASTIC COMPONENTS OF AN ELECTRONIC CIGARETTE

PRIORITY CLAIM

This application claims priority from Italian Patent Application No. 102016000089504 filed on Sep. 5, 2016, the disclosure of which is incorporated by reference.

TECHNICAL FIELD

The present invention falls within the technical field of electronic cigarettes. In detail, the invention relates to a system and method for in-line controlling the ultrasonic welding of plastic components of an electronic cigarette.

PRIOR ART

As is well known, an electronic cigarette allows the vaporization of a solution (generally water-based, propylene glycol and glycerol) by heating the same by way of electrical energy.

An electronic cigarette comprises a number of components that are assembled together at stations arranged in cascade along the assembly line.

In detail, an electronic cigarette comprises a rechargeable battery for supplying electrical energy to a pair of terminals. The latter are fixed to a resistor, which comprises a plurality of wires wound on a wick soaked with the solution to be vaporized. The activation of the battery that supplies the terminals causes the heating of the resistor, leading to the vaporization of the solution.

The electronic cigarette comprises, furthermore, an air passage channel made of plastic material, extending from a support element (also made of plastic material) with which it is made in a single body.

The two terminals protrude from the support element, laterally with respect to the air passage channel, housed in plastic attachments (as a single body with the air passage channel and the support element) to protrude from the latter with a respective end, so as to be welded to the resistor windings. At the opposite ends the terminals carry connectors, for the connection to the rechargeable battery.

The unit made of plastic material just described (obtained by molding) is fixed, at the respective support element to a base, generally cylindrical, and also made of plastic material.

The base has a through hole which is coaxial with the opening of the air passage channel, once welding is performed. In particular, the fixing of the base to the support element is done by means of ultrasonic welding.

The ultrasonic welding, as is well-known, uses high frequency sound energy to melt together plastic materials at a welding zone.

This ultrasonic welding must be hermetically sealed. Otherwise, in fact, the proper functioning of the electronic cigarette would fail. Therefore, checks must be run on plastic components welded to one another before proceeding with the assembly of the electronic cigarette.

For this purpose, control systems outside the electronic cigarette assembly line are currently being used, which detect the quality of the ultrasonic welding. However, known control systems are time consuming, which require the application of the control system off of the electronic cigarette assembly line. This makes the control system complex and inefficient, as the components have to be removed from the assembly line and then reintroduced into the same at the end of the control operations.

Patent Application US20150223522A1 and Patent Application WO2014150979A1 describe a pneumatic control station in which an air flow is directed through a partially assembled cartridge for an electronic cigarette and a jump in pressure on the partially assembled cartridge is detected; however, said control station can not effectively determine (i.e. without appreciable false positives and false negatives) and efficiently (i.e. simply and quickly) the quality of the ultrasonic welding between the base and the support element.

DESCRIPTION OF THE INVENTION

The object of the present invention is to overcome the drawbacks outlined above. This object is achieved by providing a system and method for in-line controlling the ultrasonic welding of plastic components of an electronic cigarette according to the attached claims.

Advantageously, the system and method object of the present invention allow the ultrasonic welding to be controlled in a faster manner with respect to the known art, allowing verification operations to be carried out in the assembly line of the electronic cigarette. In other words, the proposed system and method allow the execution of control operations having compatible timing with processing times (cycle times) of a machine for assembling an electronic cigarette.

BRIEF DESCRIPTION OF THE DRAWINGS

Specific embodiments of the invention and further advantages will be apparent in the following discussion, with the aid of the attached figures, wherein:

FIG. 3 illustrates a schematic and exemplificative view of a system (1) for in-line controlling the ultrasonic welding of plastic components of an electronic cigarette according to the present invention.

PREFERRED EMBODIMENTS OF THE INVENTION

With reference to the accompanying FIG. 3, number 1 denotes a system for in-line controlling the ultrasonic welding of plastic components F, S, B of an electronic cigarette according to the present invention. In particular, the term "in-line" means that the system 1, object of the invention, is able to operate in the assembly line of the electronic cigarette, as will be further clarified in the following discussion.

The plastic components F, S, B are welded to one another (by ultrasound) at a welding zone Z so as to define a welded group G. Said plastic components F, S, B are shaped so that, once welded to one another, in the welded group G an air passage duct P is defined, having a first open end E1 and a second open end E2, opposing each other (reference is made in detail to FIGS. 1 and 2).

Figure 1:
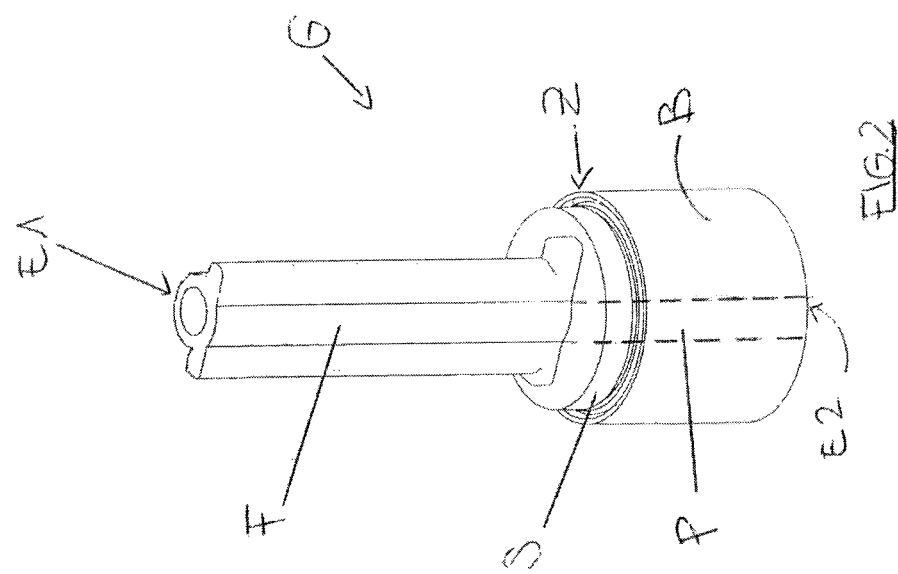
FIGS. 1 and 2 each illustrate prospective views of a welded group of plastic components as part of an electronic cigarette on which the welding check is to be performed.
Figure 2:
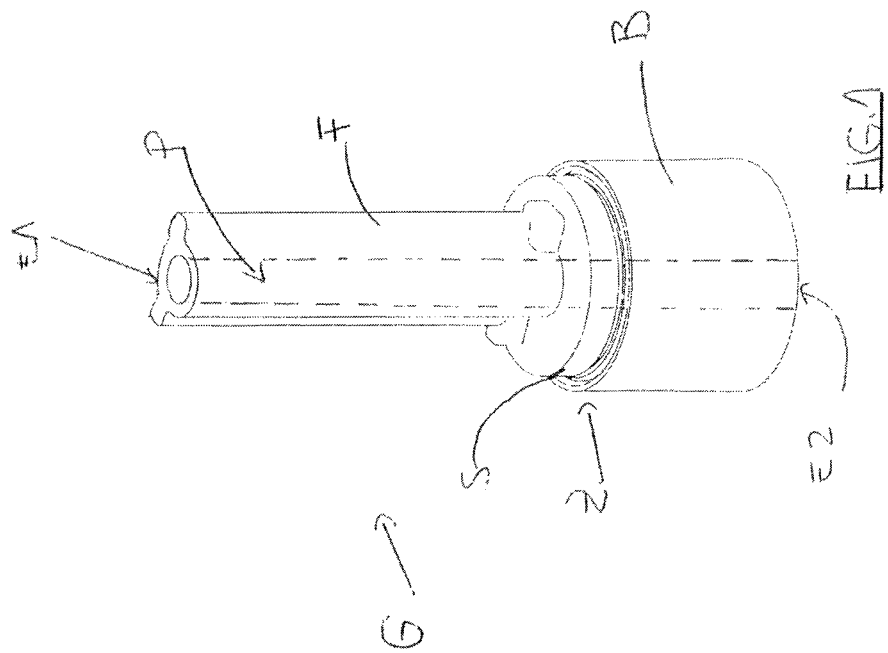

For example, with particular reference to FIGS. 1 and 2, the plastic components F, S, B that form the welded group G comprise an air passage channel F made of plastic material (also known in the field as "flow tube") which protrudes from a support S made of plastic material (perforated at the end of the channel) with which it is made in a single body (e.g. by molding), and a base B, cylindrical-shaped and made of plastic material. The base B has a through opening (visible only in a schematic manner) coaxial with the air passage channel F once the components F, S, B are welded to one another (in detail, the base B is welded to support S made of plastic material, also affected by the opening of channel F). In other words, the through opening of the base B and the free end of the air passage channel F form, respectively, the second open end E2 and the first open end E1 of the air passage duct P of the welded group G.

With reference to FIG. 3, the system 1 according to the invention comprises: a chamber 2 for receiving the welded group G; closure means 3 (e.g. a rubber element) for closing the first open end E1 of the air passage duct P of the welded group G; and air supplying means 6 (schematically illustrated) for supplying air into chamber 2 so that the air enters the air passage duct P by means of the respective second open end E2.

The system 1 further comprises air exiting means 4, 40, arranged for connecting the welding zone Z with the outside of the chamber 2 allowing the possible exit of air outside the chamber 2. The chamber 2, therefore, is closed except for the air exiting means 4, 40 for the air, which are however isolated from the rest of chamber 2. In FIG. 3, the air exiting means 4, 40 are illustrated only in a schematic and exemplificative manner.

For example, the air exiting means 4, 40 comprise a sealing ring 40 (O-ring) and a channel 4 communicating directly with the outside of the chamber 2 and which is arranged between the chamber 2 and the welded group G. The sealing ring 40 is mounted inside chamber 2 immediately downstream of the welding zone Z of the welded group G (once arranged within the chamber 2) and obstructs (i.e. prevents) the exit of air outside the chamber 2 downstream of welding zone Z in case of defective welding, forcing the air to travel in the channel 4 for it to arrive outside of the chamber 2 thanks to an air exit U (shown in FIG. 3 as an example), arranged at one end of exiting channel 4.

Furthermore, the system 1 comprises: continuous pressure control and adjustment means 5 (also schematically illustrated), arranged between the air supplying means 6 and the second open end E2 of the air passage duct P, for continuously controlling and regulating the air pressure that enters in the air passage duct P, thus keeping a fixed (constant) air pressure; an air passage nozzle 7 (i.e. a short duct illustrated only schematically in FIG. 3) having a predetermined cross section, interposed between the continuous pressure control and adjustment means 5 and the second open end E2 of the air passage duct P. The system 1 can comprise abutment means (for example, formed by a perforated rubber element, not illustrated in the figures) in abutment on the second open end E2 of the air passage duct P, allowing the passage of air through the same.

The system 1 further comprises a pressure sensor 8 (e.g. a transducer, illustrated schematically in FIG. 3), connected to the chamber 2, to detect the back pressure (i.e. the return pressure) of the air generated in chamber 2 after the introduction of the same into the air passage duct P.

Advantageously, the proposed system 1 reduces the quality control time needed for the ultrasonic welding performed on the plastic components F, S, B.

In fact, thanks to the continuous pressure control and adjustment means 5, it is possible to supply air at a controlled and stable pressure over time (pressure for example, being set to 1 bar). Furthermore, as the nozzle 7 has a predetermined cross section, (e.g. 0.2 mm), the strength that nozzle 7 offers is also known. Airflow flow rate is also known due to the fixed pressure and the constant section of the nozzle 7.

Consequently, the back pressure generated by the introduction of air into the air passage duct P depends solely on the resistor offered by the welded group G of plastic components F, S, B. In other words, the air backpressure depends solely on the presence or absence of any leakage of air in the welding zone Z (which, if necessary, flows out from the chamber 2 through the air exiting means 4, 40). Said back pressure, which is representative of any leakage and therefore the quality of the welding between the components, is detected by the suitably arranged pressure sensor 8. Therefore, the control operations are faster than those of the known art, allowing the system 1 to be integrated in the electronic cigarette assembly line. Technical tests have shown, in fact, that the time required to perform said control operations is compatible with that provided for the assembly lines and are typically comprised between 100 msec and 200 msec. In contrast, known systems require a longer time to perform control operations (between 500 msec and 600 msec), and therefore, necessarily require a system arranged off of the assembly line.

Preferably, the continuous pressure control and adjustment means comprise a proportional solenoid valve 5 (shown schematically in FIG. 3). The proportional solenoid valve 5, advantageously, allows to regulate the air pressure in an easy manner, which remains stable, thanks to a rapid adjustment obtained, if necessary, by continuously acting on the electrical signal of the same proportional solenoid valve 5. The value detected by the pressure sensor 8 is compared with a reference pressure value (or with a range of values): if the value is acceptable, the welded group G is forwarded along the electronic cigarette assembly line, otherwise it is discarded towards an exit zone of the line. For this purpose, the system further comprises a control unit (not illustrated) comprising an internal memory in which at least one reference pressure value is stored.

The control unit is connected to the pressure sensor 8 for comparing the back pressure detected within chamber 2 and the reference pressure value.

The system 1 can comprise, for example, ejection means (not illustrated) for ejecting (discarding) a welded group G from system 1 if the detected back pressure is lower than the reference pressure value (that is if the piece is defective). If, however, if the detected back pressure is equal to or higher than the reference pressure value, the welded group G is conveyed to the next station of the assembly line.

According to an alternative, the ejection means may not be provided in the system 1 and must instead be arranged in a downstream station of the assembly line.

Preferably, the distance between the nozzle 7 and the second open end E2 of the air passage duct P is shorter than the distance between the nozzle 7 and the proportional solenoid valve. Said aspect offers greater reliability to the system 1.

The invention further relates to an assembly line (not illustrated) of an electronic cigarette. The assembly line comprises: at least one feeding station for feeding plastic components F, S, B of an electronic cigarette to be welded and an ultrasonic welding station for welding the plastic components F, S, B to one another, so as to form a welded group G at the welding zone Z. The ultrasonic welding station is arranged downstream of the above mentioned feeding station.

In particular, the assembly line further comprises a control station, comprising a system 1 for in-line controlling the ultrasonic welding of plastic components F, S, B of an electronic cigarette as described above. The control station, clearly, is arranged downstream of the ultrasonic welding station, to receive at least one welded group G.

Further stations may be provided downstream of the control station where the welded group G is conveyed if it is not defective. For example, additional stations may be provided to feed other components to be assembled.

The invention further relates to a method for in-line controlling the ultrasonic welding of plastic components F, S, B of an electronic cigarette, the method provides the same advantages of the system 1 as described above.

In the same manner as mentioned before, the plastic components F, S, B are welded to one another (by means of ultrasound) at a welding zone Z so as to define a welded group G. The plastic components F, S, B are also conformed in such a way that in the welded group G an air passage duct P is provided, having a first open end E1 and a second open end E2, opposing each other.

The method according to the invention comprises the steps of:
- arranging the welded group G within a chamber 2 that comprises air exiting means 4, 40 arranged for connecting the welding zone Z with the outside of the chamber 2, thus allowing the possible exit of air outside the chamber 2;
- closing the first open end E1 of the air passage duct P of the welded group G;
- supplying air in the chamber 2, the air being supplied with a predetermined pressure and a fixed flow rate, determining the introduction of the air in the air passage duct P through its second open end E; and subsequently:
- detecting the air back pressure generated in chamber 2 after the introduction of air into the air passage duct P.

The method, therefore, thanks to the step of supplying air at a predetermined pressure and with a constant flow (for example, by means of a nozzle 7 having a predetermined cross section, which provides a fixed resistor, as explained above) into the chamber 2 allows the introduction of air in the air passage duct P through its second open end E2.

Preferably, the method comprises, as a result of the step of detecting the air back pressure that is generated after the introduction of air into the air passage duct P, the step of comparing the detected back pressure with a reference pressure value (or a range of values).

According to the preferred embodiment, the method comprises the step of discarding the welded group G if the detected back pressure is lower than the reference pressure value.

Advantageously, the proposed invention is able to make an assembly line (machine) for the assembly of an electronic cigarette more efficient as it can be integrated with the same while maintaining the standard processing times (cycle times) unchanged, and hence the respective productivity.

The invention claimed is:

1. A system (1) for in-line controlling the ultrasonic welding of plastic components (F, S, B) of an electronic cigarette, said plastic components (F, S, B) being welded one to the other at a welding zone (Z) so as to define a welded group (G); the plastic components (F, S, B) being conformed in such a way that the welded group (G) comprises an air passage duct (P) having a first open end (E1) and a second open end (E2);
the system (1) being characterized in that it comprises:
- a chamber (2) for receiving the welded group (G);
- closure means (3), for closing the first open end (E1) of the air passage duct (P) of the welded group (G);
- air supplying means (6) for supplying air into the chamber (2) determining the introduction of air in the air passage duct (P) through its second open end (E2);
- air exiting means (4, 40), arranged for connecting the welding zone (Z) with the outside of the chamber (2), allowing the possible exit of air outside the chamber (2);
- continuous pressure control and adjustment means (5), arranged between the air supplying means (6) and the second open end (E2) of the air passage duct (P) for continuously controlling and regulating the air pressure that enters in the air passage duct (P), in order to keep a fixed air pressure;
- an air passage nozzle (7) having a determined cross section, interposed between the continuous pressure control and adjustment means (5) and the second open end (E2) of the air passage duct (P), through which the air passes; and
- a pressure sensor (8), connected to the chamber (2), for detecting an air back pressure generated in the chamber (2) after the introduction of air into the air passage duct (P).

2. The system (1) according to the preceding claim, wherein the continuous pressure control and adjustment means comprise a proportional solenoid valve (5).

3. The system (1) according to claim 2, wherein the distance between the nozzle (7) and the second open end (E2) of the air passage duct (P) is shorter than the distance between the nozzle (7) and the proportional solenoid valve (5).

4. The system (1) according to claim 1, wherein the air exiting means (4, 40) comprise:
- a sealing ring (40) arranged inside the chamber (2) at the welding zone (Z) of the welded group (G); and
- an outlet duct (4) arranged between the chamber (2) and the welded group (G); the sealing ring (40) and the outlet duct (4) being arranged so that the possible exiting of the air is blocked by the sealing ring (40) downstream of the welding zone (Z), and therefore the air travels in the outlet duct (4) for arriving outside the chamber (2) through an air exit (U).

5. The system (1) according to claim 1, further comprising a control unit comprising in turn an internal memory in which a reference pressure value is stored; the control unit being connected to the pressure sensor (8) for comparing the detected back pressure within the chamber (2) and said reference pressure value.

6. The system (1) according to claim 5, further comprising discharging means, for discharging a welded group (G) out of the system (1) if the detected back pressure is lower than the reference pressure value.

7. An electronic cigarette assembling line, comprising:
- at least one feeding station for feeding plastic components (F, S, B) of an electronic cigarette to be welded;
- an ultrasonic welding station, arranged downstream of the feeding station, for welding the plastic components (F, S, B) to one another in order to form a welded group (G); and
- a control station, arranged downstream of the welding station, comprising a system (1) for in-line controlling the ultrasonic welding of plastic components (F, S, B) of an electronic cigarette according to claim 1.

8. A method for in-line controlling the ultrasonic welding of plastic components (F, S, B) of an electronic cigarette, said plastic components (F, S, B) being welded one to the other at a welding zone (Z) so as to define a welded group (G); the plastic components being conformed in such a way that the welded group (G) comprises an air passage duct (P) having a first open end (E1) and a second open end (E2), opposing each other;

the method being characterized in that it comprises the steps of:

arranging the welded group (G) into a chamber (2) that comprises air exiting means (4, 40), arranged for connecting the welding zone (Z) with the outside of the chamber (2), allowing the possible exit of air outside the chamber (2);

closing the first open end (E1) of the air passage duct (P) of the welded group (G);

supplying air in the chamber (2), the air being supplied with a predetermined pressure and a fixed flow rate, determining the introduction of air in the air passage duct (P) through its second open end (E2); and detecting the air back pressure generated in the chamber (2) after the introduction of air into the air passage duct (P).

9. The method according to claim 8, further comprising, after the step of detecting the air back pressure generated after the introduction of air into the air passage duct, the step of comparing the detected back pressure with a reference pressure value.

10. The method according to claim 9, further comprising the step of discarding the welded group (G) if the detected back pressure is lower than the reference pressure value.

* * * * *